United States Patent

[11] 3,610,732

| [72] | Inventors | Michael E. Mack;<br>Edmond B. Treacy, Vernon, Conn. |
|---|---|---|
| [21] | Appl. No. | 871,856 |
| [22] | Filed | Oct. 28, 1969 |
| [45] | Patented | Oct. 5, 1971 |
| [73] | Assignee | United Aircraft Corporation<br>East Hartford, Conn. |

[54] NONLINEAR IMAGE CONTRAST AMPLIFIER SYSTEM
7 Claims, 1 Drawing Fig.

[52] U.S. Cl. .................................................. 350/162 SF,
    350/3.5, 350/160 R
[51] Int. Cl. .................................................. G02b 27/38
[50] Field of Search .................................... 350/162 SF;
    330/4.3; 332/7.51; 307/88.3; 250/213

[56] References Cited
UNITED STATES PATENTS

| 3,240,108 | 3/1966 | Lehan et al. | 350/126 SF UX |
| 3,293,565 | 12/1966 | Hardy | 331/94.5 |
| 3,309,526 | 3/1967 | Giordmaine | 307/88.3 |
| 3,379,998 | 4/1968 | Soules et al. | 331/94.5 |
| 3,444,316 | 5/1969 | Gerritsen | 350/3.5 X |

*Primary Examiner*— John K. Corbin
*Attorney*— Donald F. Bradley

ABSTRACT: Stimulated thermal light-scattering techniques such as the amplification of a weak beam interfering with a strong beam in absorbing media produce amplification of the contrast of weak optical images. Parallel light such as from a mode-locked laser illuminates the object to be imaged such as a transparent object. The object is placed in front of a cell filled with a liquid solution exhibiting a strong nonlinear scattering. The nonaxial waves will be amplified in the cell at the expense of the strong axial beam.

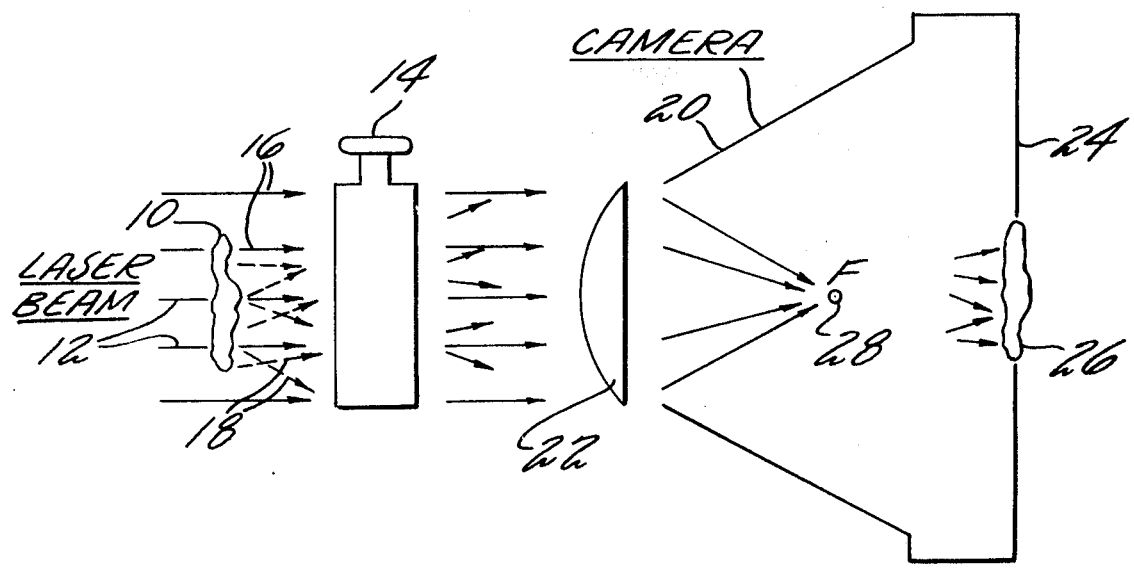

NONLINEAR IMAGE CONTRAST AMPLIFIER SYSTEM

This invention was made in the course of a contract with the U. S. Government, Office of Naval Research.

BACKGROUND OF THE INVENTION

1. Field of the Invention

This invention relates to the amplification of the contrast of weak optical images. In particular, this invention relates to the use of stimulated nonlinear scattering techniques to amplify the nonaxial image components of a transparent object to provide contrast enhancement.

The nonlinear contrast amplification system disclosed herein may be used alone or in conjunction with any known linear filtering technique to further enhance image contrast.

2. Description of the Prior Art

One of the Description which is frequently encountered in optical information processing is the weak image produced by transparent or semitransparent objects. Weak images may be produced by both phase objects and amplitude objects. An amplitude object is one in which the amplitude or intensity of the light passing through the object is varied. A photographic negative is an example of an amplitude object. A phase object is one which transmits nearly all the light incident upon it, but which produces a different phase shift through its different parts. The difference in phase shifts can arise either because of variations in the thickness or in the index of refraction of the object. The enhancement of contrast of such objects is important in a number of fields including biology, holography and crystallography.

Linear filtering techniques such as the phase contrast microscope described by Zernike may be used to enhance the contrast of phase objects. Such techniques are very useful and produce a substantial increase in contrast.

The techniques disclosed herein may be used independently, or may be combined with the known linear filtering techniques to further enhance the contrast of a weak image. Power gains of 20 or more may be produced utilizing this invention.

The contrast of an object relative to its surroundings depends upon a number of criteria such as color, size, shape, intensity, etc. Contrast is not always mathematically definable and in some situations is quite subjective. However, where the object is transparent, the contrast may be improved by increasing the ratio of the image light to the background light. Therefore, for transparent objects, increased contrast means increased visibility.

It is therefore an object of this invention to increase the visibility of a transparent or semitransparent object which produces a weak optical image by enhancing the contrast of the image by increasing the ratio of the image light to the background light.

SUMMARY OF THE INVENTION

In accordance with the present invention, the contrast of a weak image is amplified by a nonlinear scattering process which produces an amplification of the weak off-axis beams propagating through an absorbing solution in the presence of a stronger axial beam.

In a preferred embodiment of this invention, the transparent object is illuminated by the beam of a mode-locked laser immediately in front of a cell filled with a liquid solution which exhibits a strong thermal scattering. Those light waves emanating from the object which are nonaxial, that is, not along the axis determined by the strongest component of the beam, will be amplified in the liquid cell at the expense of the strong axial beam. The amplified nonaxial waves are imaged at a film plane by a camera and lens system. The contrast of the image of the object formed by the camera at the film plane is increased over that of the object itself.

In accordance with a further object of this invention, the contrast of a weak amplitude object may be enhanced by placing the amplifier in front of a photographic plate to form a holographic image.

In accordance with a further object of this invention, any nonlinear scattering process which will amplify weak off-axis beams in the presence of a strong axial beam may be used to enhance the contrast of a weak image.

In accordance with still another aspect of the present invention, the image contrast amplifying system disclosed herein may be used in conjunction with other known linear filtering techniques to further enhance the contrast of a weak image.

BRIEF DESCRIPTION OF THE DRAWING

The single FIGURE shows a preferred embodiment of the image contrast amplifier system of this invention.

DESCRIPTION OF THE PREFERRED EMBODIMENT

Referring to the FIGURE, there is shown a transparent object 10 of which an image is to be made. Object 10 may be a phase or amplitude object which will produce a weak image of low contrast with respect to its background.

Object 10 is illuminated by parallel rays of light shown as 12 such as from a laser or other source of coherent monochromatic light. Light from a mode-locked ruby laser has been used successfully.

Object 10 is placed in front of a cell 14, the cell being filled with a liquid solution having a strong thermal scattering, arising from a slight absorption in the solution. A solution of iodine dissolved in either carbon tetrachloride or quinoline has been used successfully.

The light which is transmitted through the object may be described as an angular spectrum of plane waves with a strong central component. The central component consists of axial waves shown at 16, and nonaxial waves shown at 18. The axial waves are much stronger in intensity than in the nonaxial waves. By virtue of the thermal scattering effect, during the time that both the axial waves 16 and the nonaxial waves 18 pass through the liquid cell, the power in the off-axis waves will be amplified at the expense of the strong axial beam.

The thermal scattering effect is described in detail and claimed in copending application, Ser. No. 792,680, entitled "Light Amplification Using Absorbing Medium" filed Jan. 21, 1969 in the name of Michael E. Mack and assigned to the same assignee as this application. In the copending application, two beams of coherent monochromatic light such as laser beams of identical or nearly identical frequencies are simultaneously incident at a small angle to each other on a cell containing an absorbing medium. One of the beams is of much higher intensity than the other. The less intense beam is amplified at the expense of the more intense beam. The cell is filled with an absorber such as cryptocyanine in a methanol solution. Many absorbers exhibit this effect.

Since the visibility or contrast of a weak transparent object is determined by the ratio of the intensity in the off-axis beams relative to the intensity in the central component or axial beam, the contrast of the image is increased over that in the object. The image is formed by a camera 20 having a lens 22 which focuses the axial beam to point 28 and images the amplified nonaxial waves on a film plane 24. The amplified image of the transparent object 10 is shown on the film plane 24 as image 26. A contrast enhancement of 20 times or more can be produced.

The origin of the thermal scattering effect which amplifies the weak off-axis beams propagating through the absorbing liquid solution in the presence of a stronger on-axis beam is believed to be a nonlinearity associated with the temperature dependence of the refractive index of the liquid. Experimental data has indicated an off-axis power gain of 20 with a solution of iodine in carbon tetrachloride having a 20 percent absorption at the laser wavelength of 6,943 angstroms.

Linear filtering techniques may be used to further enhance the image contrast amplifier system of this invention. For example, if the phase contrast techniques reported by Zernike is desired to be used, a small, attenuating disc with a phase shift of a quarter wavelength of the transmitting light may be inserted in the camera 20 at the focal point 28 of the camera lens. In another linear filtering technique called the "central dark ground" technique, a small opaque disc would be inserted at focal point 28. In either case the usual contrast improvement will be further improved by the nonlinear contrast amplification of this invention.

It will be apparent to one skilled in the art that the axial beam may be eliminated, or may be imaged at the film plane together with the amplified nonaxial beam.

The technique of this invention may also be applied to the contrast enhancement of weak amplitude objects. For example, in the formation of the simplest type hologram of a weak amplitude object, the amplifying liquid cell 14 will be placed in front of the photographic plate, eliminating lens 22. The amplification of the secondary wave amplitude would lead to an enhancement of a fringe visibility in the hologram by the same factor. In the reconstructed image, the contrast will also be increased by the same factor.

Although nonlinear thermal picosecond light pulse scattering is the preferred amplification process in the preferred embodiment of this invention, there are other nonlinear scattering processes which will amplify weak off-axis beams in the presence of a strong axial one. Any of these other processes may be used in various situations to practice this invention. For example, depending on the object from which the image is to be made, there may be occasions when the nonlinear thermal light-scattering technique of this invention may not provide the desired results. In these cases other nonlinear scattering processes may be used such as stimulated four photon scattering, stimulated thermal Rayleigh scattering, gain in saturable absorbers, etc. For these effects, lasers with longer pulse durations and lower peak powers could be used, and the embodiment shown in the FIGURE would still be applicable.

Although plane wave illumination is used in the preferred embodiment of this invention, other illumination geometries may also be used.

We claim:

1. Apparatus for enhancing the contrast of an image produced from an object which is at least partially transparent comprising means for illuminating said object with coherent light to produce both axial and nonaxial light wave components, said axial components being of much higher intensity than said nonaxial components, an optical absorbing medium positioned in the path of said light wave components for amplifying said nonaxial components at the expense of said axial components, and lens means receiving said amplified nonaxial components and said axial components and forming therefrom an image of said object.

2. Apparatus as in claim 1 and including masking means positioned in the transform plane of said lens means to attenuate said axial beam components.

3. Apparatus as in claim 1 in which said optical absorbing medium is a liquid absorbing medium contained in an optically transparent cell.

4. Apparatus as in claim 3 in which said liquid absorbing medium is a solution of iodine dissolved in a solvent chosen from the class including carbon tetrachloride and quinoline.

5. Apparatus as in claim 4 in which said laser beam is mode-locked.

6. Apparatus as in claim 1 in which said means for illuminating said object comprises a laser beam.

7. A method for enhancing the contrast of an image produced from an object which is at least partially transparent including the steps of illuminating said object with a beam of coherent light to produce both axial and nonaxial light wave components in which said axial components have a much higher intensity than said nonaxial components, passing said light wave components through a liquid absorbing medium whereby said nonaxial components are amplified at the expense of said axial components, and focusing said axial and nonaxial components to produce therefrom an image of said object.